United States Patent [19]

Bloomer et al.

[11] 4,296,632

[45] Oct. 27, 1981

[54] TEMPERATURE-TO-FREQUENCY CONVERSION APPARATUS

[75] Inventors: Milton D. Bloomer; William P. Kornrumpf, both of Schenectady, N.Y.

[73] Assignee: General Electric Company, Schenectady, N.Y.

[21] Appl. No.: 121,489

[22] Filed: Feb. 14, 1980

[51] Int. Cl.³ ............................................. G01K 7/16
[52] U.S. Cl. ................................. 73/362 AR; 331/66
[58] Field of Search ............ 73/362 AR, 342; 331/66

[56] References Cited

U.S. PATENT DOCUMENTS

| 3,872,728 | 3/1975 | Joyce et al. | 73/362 AR |
|---|---|---|---|
| 3,906,391 | 9/1975 | Murdock | 73/362 AR |
| 3,911,374 | 10/1975 | Busse et al. | 73/362 AR |
| 4,206,648 | 6/1980 | Tuska et al. | 73/362 AR |

Primary Examiner—Donald O. Woodiel
Attorney, Agent, or Firm—Geoffrey H. Krauss; James C. Davis; Marvin Snyder

[57] ABSTRACT

A temperature-to-frequency converter circuit of the type utilizing a pair of threshold switches connected across a timing capacitor for controlling a circuit output voltage to higher and lower magnitudes when the capacitor voltage respectively reaches higher and lower levels, has a linear conductance—vs.—temperature network between the output and the timing capacitance. The circuit operates as an astable multivibrator having an output frequency linearly related to temperature. The output waveform is an essential symmetrical squarewave, facilitating use with low-cost counting and display circuitry and providing a reduced level of electromagnetic interference.

27 Claims, 7 Drawing Figures

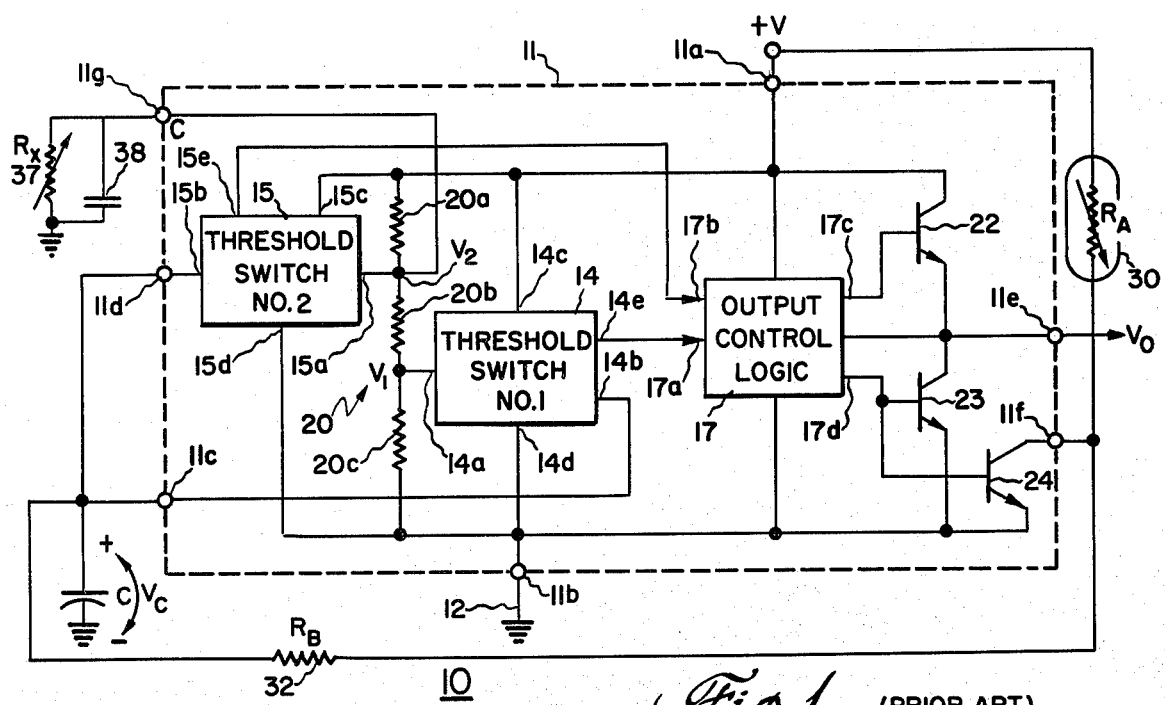
Fig. 1 (PRIOR ART)
Fig. 1a (PRIOR ART)
Fig. 1b (PRIOR ART)
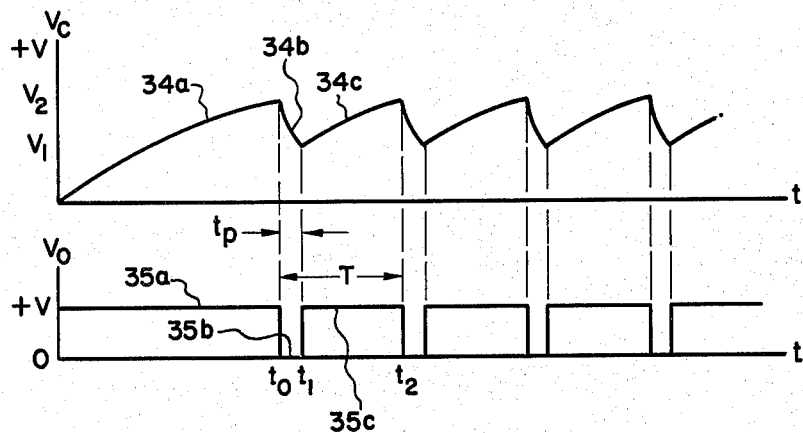
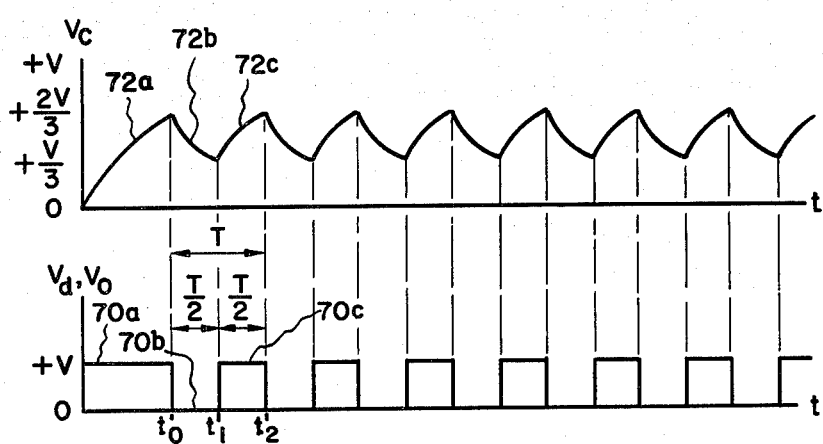
Fig. 2a
Fig. 2b

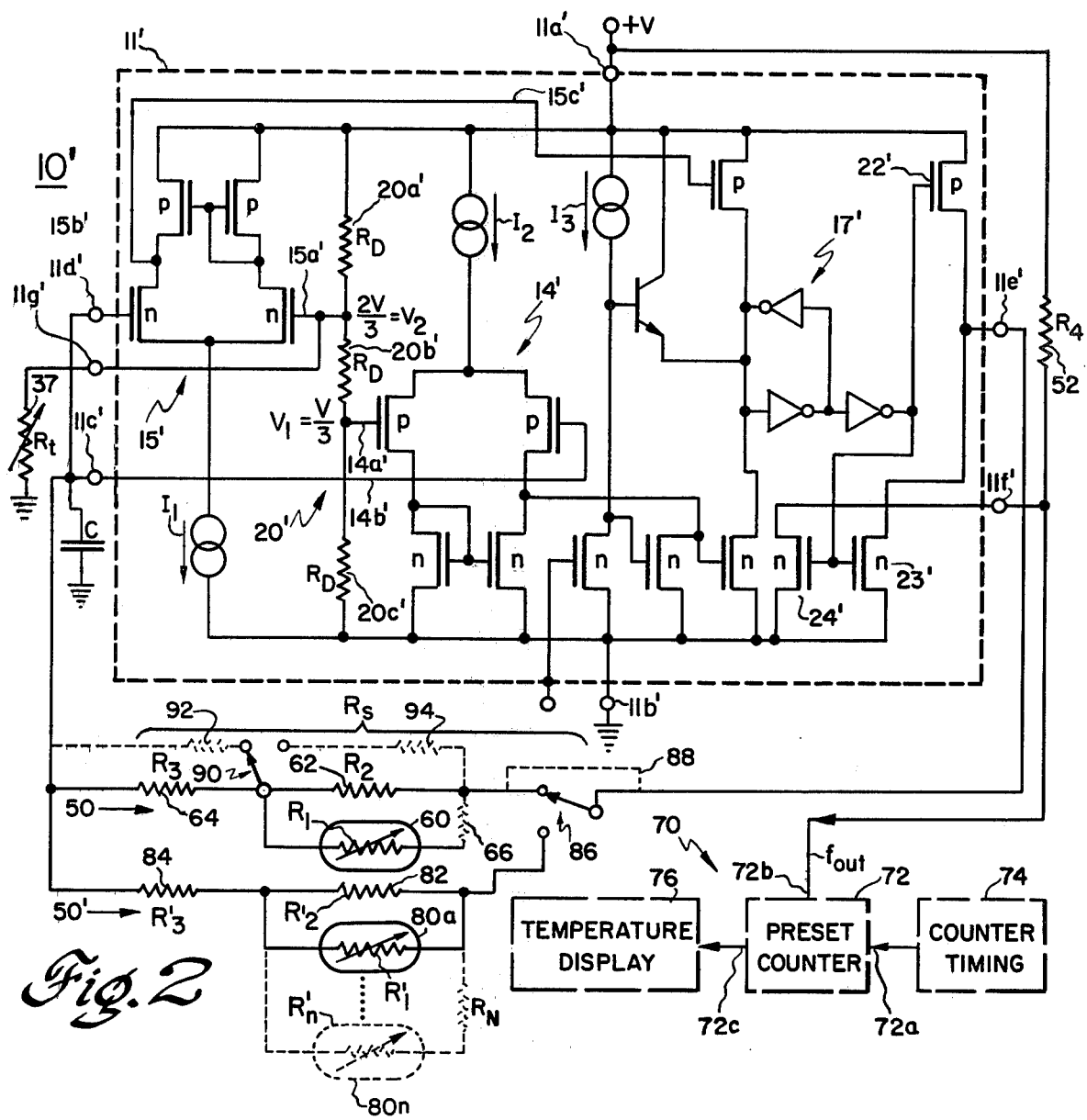
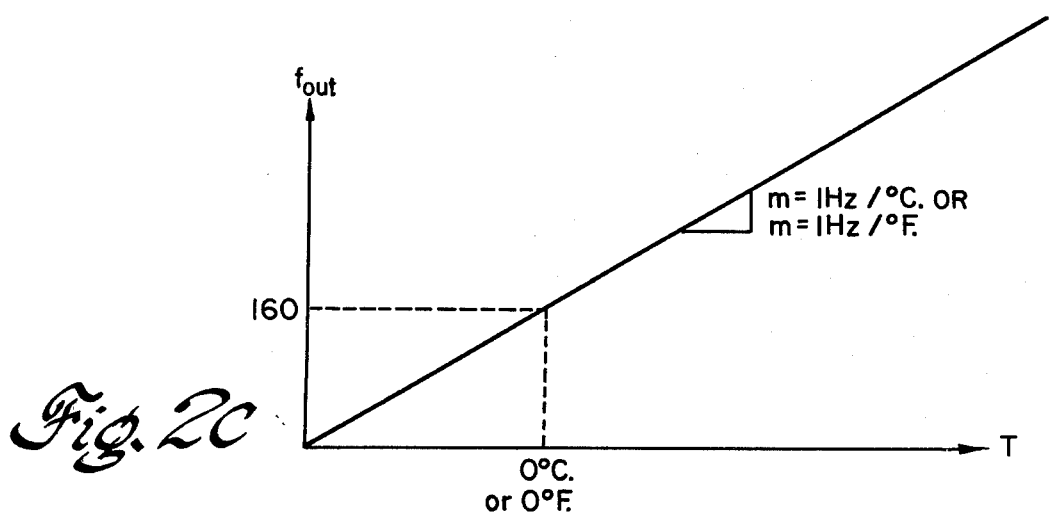
Fig. 2
Fig. 2C

TEMPERATURE-TO-FREQUENCY CONVERSION APPARATUS

BACKGROUND OF THE INVENTION

The present invention relates to temperature-sensing apparatus and, more particularly, to a novel improved temperature-to-frequency conversion apparatus.

It is known to provide apparatus for conversion of a sensed parameter, such as temperature, to a periodic signal having a frequency related to the parameter magnitude. For example, it is often desirable to provide apparatus for conversion of sensed temperature to a signal frequency, with the signal frequency being counted and displayed, as on the display apparatus of a clock, or clock radio, in which the temperature-sensing apparatus is installed. Prior art sensed-parameter-to-frequency conversion circuitry has been generally characterized by a non-linear relationship of output frequency with respect to the magnitude of the sensed parameter. Further, relatively large amounts of electromagnetic interference are typically generated by the relatively narrow (i.e. low duty cycle) output frequency pulses of prior art conversion circuits, which electromagnetic interference is particularly deleterious to proper operation of the radio receiver section of a clock radio. Additionally, many prior art circuits require that, because of tolerance variations in components (e.g. timing capacitors and the like) and supply voltage, that the circuit include some form of trimmable control element which allows compensation for the circuit-to-circuit variations, but which compensation element itself introduces additional non-linearities in the relationship of output frequency to sensed parameter magnitude. Improved apparatus for conversion of a sensed parameter to an output waveform frequency, overcoming the above-described shortcomings, and in a low cost manner, is therefore highly desirable.

BRIEF SUMMARY OF THE INVENTION

In accordance with the invention, improved apparatus for conversion of the magnitude of a sensed parameter to the frequency of an output waveform, includes first and second threshold switches each having a first input receiving respectively a higher and a lower reference voltage and each having a second input, connected in parallel to each other, and controlling the output magnitude of the apparatus voltage to respective first and second levels when the threshold switch second input voltages are respectively equal to the first and second reference levels; a timing capacitance connected in parallel to said threshold switch second inputs; and means for providing a charging current to the capacitor from the apparatus output via a circuit having a linear conductance with respect to the magnitude of the sensed parameter. Means, connected to one of the switching means first inputs, may be used for adjustably setting the apparatus output frequency to compensate for changes in the capacitance magnitude of the timing capacitor and in the magnitude of an operating potential supplied to said apparatus.

In one preferred embodiment, the substantially symmetrical output frequency waveform of the apparatus is coupled to the counting input of a presettable frequency counter for controlling a parameter display which linearly displays the magnitude of the sensed parameter.

In the preferred embodiment, the sensed parameter is temperature and the conductance sensor is a network including at least one non-linear thermistor element and at least two fixed resistances. Switching means are utilized to switch between a plurality of thermistor-resistance circuits, or to add additional fixed resistances in parallel with one or another of the fixed resistances already present in the resistor-thermistor sensor network, to provide an apparatus output waveform having a frequency linearly varying by the same number of Hertz (Hz.) for a 1° C. or a 1° F. temperature change.

Accordingly, it is an object of the present invention to provide novel improved apparatus for converting the magnitude of a sensed parameter to the frequency of a waveform.

This and other objects of the present invention will become apparent upon consideration of the following detailed description, read in conjunction with the drawings.

BRIEF DESCRIPTION OF THE DRAWINGS

FIG. 1 is a schematic block diagram of one prior art parameter-magnitude-to-frequency conversion circuit;

FIGS. 1a and 1b are interrelated graphs illustrating the capacitor and output voltage waveforms respectively, of the prior art embodiment of FIG. 1;

FIG. 2 is a schematic block diagram of one presently preferred embodiment of a temperature-to-frequency apparatus in accordance with the principles of the present invention;

FIGS. 2a and 2b are interrelated graphs illustrating the timing capacitance and output voltage waveforms of the embodiment of FIG. 2, and useful in understanding principles of the present invention; and FIG. 2c is a graph illustrating the relationship between the conversion apparatus output frequency and the magnitude of the sensed parameter (temperature).

DETAILED DESCRIPTION OF THE INVENTION

Referring initially to FIGS. 1, 1a and 1b, in one prior art temperature-to-frequency conversion circuit 10, a timer integrated circuit 11, such as a standard 555 integrated circuit and the like, is utilized. Timer 11 has first and second leads 11a and 11b between which an operating potential, of magnitude +V, is applied with respect to ground 12. The timer circuit includes first and second threshold switch means 14 and 15, each having a reference voltage input 14a and 15a, respectively, and respective signal inputs 14b and 15b, respectively connected to the respective threshold and trigger inputs 11c and 11d of the timing circuit. Both threshold switching means 14 and 15 receive operating potential at inputs 14c and 15c, respectively, with respect to ground connections 14d and 15d, respectively. Each of threshold switching means 14 and 15 has an output 14e and 15e, respectively, connected to inputs of a control logic means 17, also connected between operating potential and ground terminals 11a and 11b, respectively. The reference potential magnitude $V_1$ at the first reference switch means reference input 14a is less than the reference potential magnitude $V_2$ at the second threshold switch means reference input 15a; the reference potentials are established by a voltage divider 20 comprising a first resistance 20a connected between operating potential terminal 11a and second threshold switch means reference input 15a, a second resistance 20b connected between the respective reference input terminals 14a and 15a of the first and second threshold switch means, and a third resistance 20c connected between first threshold switch means input terminal 14a and ground potential terminal 11b. Output control logic means 17 includes complimentary first and second outputs 17c and 17d for controlling output devices 22 and 23 to establish the magnitude $V_0$ of the voltage at timer output terminal 11e; the output voltage is at a high level, substantially equal to the operating potential magnitude +V, when device 22 conducts responsive to enablement of output control logic means output 17c; the timer output has a relatively low magnitude, i.e. substantially ground potential, when device 23 conducts responsive to enablement of output control logic means output 17d. Another switching device 24 also receives the output logic control means output 17d signal for connecting a timer circuit discharge terminal 11f to ground potential whenever the timer circuit output voltage $V_0$ is substantially at ground potential.

Timer circuit 11 is configured as an astable multivibrator by connection of trigger and threshold inputs 11c and 11d together and to one terminal of a timing capacitance C, having its other terminal connected to ground potential. A resistance sensor 30, having a resistance $R_A$ related to the magnitude of the sensed parameter, e.g. temperature, is connected between the operating potential source and discharge terminal 11f. A fixed resistance 32, of magnitude $R_B$, is connected between discharge terminal 11f and the terminal of capacitance C at the paralleled trigger and threshold terminals 11c and 11d.

In operation, upon application of operating potential of magnitude +V, current flows through the resistance $R_A$ of sensor 30 and the resistance $R_B$ of resistor 32 to charge timing capacitance C. The voltage $V_c$ (FIG. 1a) across the timing capacitance increases (segment 34a of FIG. 1a) toward operating potential magnitude V, until the voltage at first threshold switch means signal input 14b is greater than first reference voltage $V_1$ connected at the reference voltage 14a thereof, and threshold switch means output 14e is activated to enable output control logic means output 17c and provide a circuit output voltage $V_0$ level (FIG. 1b) substantially equal to the operating potential voltage, as at output voltage segment 35a. At some time $t_0$, the capacitance voltage $V_c$ has risen to the equal in magnitude to the second reference voltage $V_2$ magnitude, whereupon second threshold switch means 15 enables the output 15e thereof to cause switching devices 23 and 24 to be activated. The magnitude of output voltage $V_0$ falls to substantially zero volts, as at output voltage segment 35b, while connection of discharge terminal 11f substantially to ground potential causes timing capacitance C to discharge toward ground potential through resistance 32, thereby decreasing the voltage at terminals 11c and 11d. The voltage across capacitance C decreases, as shown in graph segment 34b of FIG. 1a, until the voltage $V_c$ at first threshold switch means signal input 14b is equal to the lower reference voltage of magnitude $V_1$ at the reference input 14a thereof. At this time, $t_1$, the first threshold switch means output 14e is enabled to disable output control logic means output 17d (opening the connection between timer discharge terminal 11f and ground potential) and to enable output logic control means output 17c to operate switching device 22 to raise the output voltage $V_0$ substantially to the operating potential magnitude, as at graph segment 35c of FIG. 1b. The removal of a substantial short between ground potential and the timer discharge terminal 11f allows the capacitance C to again charge, towards operating potential magnitude +V, as shown by graph segment 34c of FIG. 1a through the series resistances of fixed resistor 32 and the resistance of sensor 30. The charge-discharge cycle continues as long as operating potential is supplied to the circuit.

It is known that, for a standard 555 timer integrated circuit utilized for timer 11, the output frequency ($f_o$), which is the inverse of the cycle time interval T, is given by the relationship $$f_o = 1.44/C(R_A + 2R_B).$$

Thus, the output frequency is a non-linear function of the total circuit resistance (resistance $R_B$ and sensor resistance $R_A$) and is a non-linear function of the sensed parameter magnitude, as sensor resistance $R_A$ is itself a non-linear function of the sensed parameter magnitude. Resistance 32 can not be made to zero magnitude, because the capacitive discharge time must be limited to a finite value established by the rating of device 24; therefore, the output frequency cannot be forced to a linear function of the sensed parameter magnitude.

Additionally, the exact value of the resistance magnitude $R_B$ of resistor 32 is somewhat different for each physically individual resistor, even of the same nominal value; the resistance $R_A$ of different sensors, even at the same sensed parameter magnitude, will vary; and the exact capacitance of timing capacitor C changes from unit to unit. Therefore, a variable compensation element 37 of trimmerable resistance $R_x$ must be utilized, connected to a compensation terminal 11g of the circuit, to be electrically parallelled across divider resistances 20b and 20c. When compensation resistance 37 is utilized, a compensation factor A is introduced. Factor A is a function of a factor k, with $A = 2(k-1)/(k-2)$; while factor k is related to the magnitudes $R_{20a}$-$R_{20c}$ of resistances 20a-20c and to compensation resistance magnitude $R_x$, as follows:

$$k = (R_{20b} + R_{20c})/(R_{20a} + R_{20b} + R_{20c}).$$

Therefore, the output frequency $f_o$ is given by the equation:

$$f_o = -1/C(R_A \ln A + R_B(\ln 0.5 + \ln A))$$

which is a non-linear function of $1/(R_A, R_B)$, except when $R_B$ has a zero magnitude, which, as previously explained hereinabove, does not occur due to the necessity for limiting capacitance discharge currents. Therefore, in practical applications requiring compensation resistance $R_x$, the output frequency is always a non-linear function of the sensed parameter. Because capacitor C discharges toward a voltage equal to ground potential plus the temperature-varying voltage drop across the saturated device 24, the discharge time $t_p$ will vary as a function of temperature, hereby the total cycle time interval T, and thereby the output waveform frequency, will change in a manner not controlled by the sensor network. It will also be seen that, with the desirable relatively low resistance of resistor 32, the relatively rapid discharge of the capacitor, between times $t_0$ and $t_1$, results in an output pulse of relatively short duration $t_p$, compared to the total time interval T required for one cycle of the conversion circuit output waveform. The relatively large discharge current flowing in this relatively small time interval causes considerable harmonics to be generated and results in a high degree of electromagnetic interference. The very narrow output signal pulse must often be buffered (adding additional cost and complexity to the circuit and generating additional electromagnetic interference) if the output pulse is to be utilized by subsequent circuitry (not shown).

In another prior art temperature-to-frequency conversion circuit (not shown) described and claimed in pending application Ser. No. 093,841, filed Nov. 13, 1979, assigned to the assignee of the present invention and incorporated herein by reference, a similar timing integrated circuit 11 and timing capacitor C are utilized, with the capacitor charging current being the difference between a temperature-related current, supplied by a temperature-to-current source (such as found in the National Semiconductor Corp. LM334 integrated circuit and the like) less a current subtracted therefrom by a current mirror circuit. The temperature-dependent current source and current mirror circuits replace sensor 30, and are directly connected between the operating potential supply and the trigger-threshold inputs 11c and 11d of the timer, while discharge resistor 32 remains connected between the charging terminal of the timing capacitance and the timing discharge terminal. The output frequency-versus-sensed parameter magnitude relationship is substantially linear, as the discharge resistance does not affect the timing capacitance charging time interval, but a narrow output signal pulse, generating high-level electromagnetic interference and typically requiring buffering, is still present. Cost is increased, as additional active devices are now required for the temperature-to-current source and the current mirror circuit.

Referring now to FIGS. 2 and 2a–2c, an improved sensed parameter-to-frequency conversion apparatus 10' (FIG. 2) utilizes a CMOS timer circuit 11', such as the type 7555 integrated circuit available from Intersil and the like. Timer 11' includes first and second threshold switch means 14' and 15' having respective reference inputs 14a' and 14b' connected to a resistive voltage divider 20', and respective signal inputs 14b' and 15b' respectively connected to trigger and threshold terminals 11c' and 11d'. Outputs 14e' and 15e' of the respective first and second threshold switch means are respectively connected to an output logic control means 17' for controlling the state of output switching devices 22' and 23' (controlling the voltage level at timer output 11e') and of a discharge switching device 24' (controlling the connection of a discharge terminal 11f' to ground potential at terminal 11b'). The trigger and threshold terminals 11c' and 11d' are connected in parallel to one terminal of timing capacitance C and to one terminal of a sensor network 50, having a sensor resistance $R_s$, in series with timer output 11e'. A load resistor 52, of resistance magnitude $R_4$, is connected beteen the operating potential terminal 11a' and the discharge terminal 11f', from which the output waveform of the conversion apparatus is taken.

In accordance with the invention, sensor network 50 provides a linear relationship of conductance $(1/R_S)$ to sensed parameter magnitude, to provide highly linear timing capacitance charging and discharging currents. The network includes at least one resistance sensor 60, having a resistance $R_1$ which is a function, typically non-linear, of the magnitude of the sensed parameter. A fixed resistance 62, of selected magnitude $R_2$, is connected in parallel across the resistance of sensor 60, and another fixed resistance element 64, of selected magnitude $R_3$, is connected in series with the paralleled sensor 60-fixed resistance 62 circuit. For a highly linear conductance-versus-sensed parameter magnitude relationship, an additional fixed resistance 66 can be connected in series with sensor 60, with the values of fixed resistances 62, 64 and 66 being selected in accordance with the method described and claimed in co-pending application Ser. No. 121,488, filed on even date herewith.

To compensate for deviations in the value of divider ratio k and timing capacitance magnitude from the design values assumed therefore, a compensation control 37', of settable resistance $R_t$, is connected to compensation terminal 11g'. Once the magnitude of compensation resistance 37 is set, at initial manufacture, the magnitude $R_t$ is held essentially constant thereafter.

In operation, upon initial application of operating potential, output device 22' of timer 11' is initially enabled and the output voltage $V_o$ (FIG. 2b) is substantially at the operating potential magnitude +V (portion 70a of the waveform). Timing capacitance C charges solely through the equivalent series sensor resistance $R_s$ of sensor 50 and the relatively low and substantially constant saturation resistance of the output switching device 22' (which is preferably of the FET type), toward operating potential magnitude +V, as shown in waveform segment 72a of FIG. 2a. The timer internal divider 20' is comprised of three resistances 20a', 20b' and 20c', which may be of substantially equal magnitude $R_D$, whereby the higher reference potential $V_2$ is substantially equal to $(2 V/3)$ and the lower reference potential $V_1$ is substantially equal to $(V/3)$. When the capacitor voltage $V_c$ has increased to equal the higher reference voltage potential $V_2$, second threshold switch means 15' is enabled to cause both switching devices 23' and 24' to switch to their saturated condition, and to switch 22' to the cutoff condition. Accordingly, the output voltage $V_o$ and the discharge terminal voltage $V_d$ are both set, at time $t_o'$, to ground potential, as shown by waveform segment 70b of FIG. 2b. The switching of the output voltage to ground potential causes discharge of timing capacitance C solely through sensor series resistance $R_s$ of sensor network 50 and the relatively low, substantially constant saturation resistance of device 23'. The capacitor voltage $V_c$ decreases, as at waveform segment 72b of FIG. 2a, until, at time $t_1'$, the magnitude of the voltage at trigger input 11c' of the timing circuit is equal to the first reference voltage magnitude $V_1$. First threshold switching means 14' is now enabled to switch devices 23' and 24' to the cutoff condition and to switch device 22' to the saturated condition, whereby both the output voltage $V_0$ and the discharge terminal voltage $V_d$ rise to the operating potential magnitude +V, as shown in waveform segment 70c of FIG. 2b. Timing capacitance C now again charges toward the operating potential magnitude, solely through the series resistance $R_s$ of sensor network 50 and the substantially constant, relatively low saturation resistance of device 22'. The rising capacitance voltage, shown at waveform segment 72c of FIG. 2a, eventually reaches, at time $t_2'$, the higher reference voltage magnitude $V_2$ when second threshold switch means 15' is activated and the entire cycle repeats.

It will be seen that the voltage $V_c$ across the timing capacitor is a waveform having essentially equal timing intervals, e.g. between time $t_0'$ and time $t_1'$ and between time $t_1'$ and $t_2'$, for the respective discharge and charge portions of the triangular wave. It will also be seen that the discharge and output terminal waveforms are essentially squarewaves having essentially equal time intervals T/2 during which waveforms are at substantially ground potential and at substantially operating potential, for a waveform having a total time interval T. As the saturation resistances of devices 22' and 23' are typically at least two orders of magnitude less than the sensor network resistance magnitude, the magnitude of the charge and discharge currents are essentially established by only a single resistance (the resistance $R_s$ of the sensor network), and these essentially equal magnitude currents establish essentially equal charge and discharge time intervals. An output waveform having narrow pulses is thus eliminated, substantially reducing electromagnetic interference, while the substantially symmetrical output waveform facilitates simplified frequency counting in subsequent circuitry (to be described hereinbelow). As only a single resistive component contributes to the timing of the waveform, the total time interval T and therefore the inverse thereof, the output frequency F, is dependent only upon the sensor resistance. The output frequency $f_{OUT}$ is, in general, given by the expression:

$$f_{out} = \frac{-1}{BR_s C}$$

where $B = \ln 0.5 + \ln(2(k'-1)/(k''-2))$, and $$k'' = \frac{(R_{20b'} + R_{20c'})R_t/(R_t + R_{20b'} + R_{20c'})}{R_{20a'} + (R_{20b'} + R_{20c'})R_t/(R_t + R_{20b'} + R_{20c'})}$$

If compensation resistor 37 is not utilized, the output frequency is given, when k" is equal to two-thirds, by the expression $f_{OUT} = (0.72)/(R_S C)$ or $f_{OUT} = (0.72)G_s/C$, where $G_S$ at the sensor conductance ($G_S = 1/R_S$) and k" is now a factor (k') equal to the ratio of the sum of resistances 20b' and 20c' to the sum of resistances 20a', 20b' and 20c', i.e. $k' = (R_{20b'} + R_{20c'})/(R_{20a'} + R_{20b'} + R_{20c'})$. Therefore, frequency is a linear function of sensor conductance $G_S$, which can itself be made highly linear with respect to changes in the magnitude of the sensed parameter. When compensation resistor 37 is utilized, the magnitude $R_t$ of the compensation resistance reduces both reference voltages $V_2$ and $V_1$ by proportional amounts, whereby the time interval T for one cycle will somewhat decrease, by a factor which is a function of $R_t$, and, more particularly, $B = \ln 0.5 + \ln(2(k'-1)/(k'-2))$, where k' is defined as above. The compensated output frequency F is now given by the expression $F = G_S/(BC)$. As B is set initially and not readjusted, i.e. B = K (a constant), the frequency of the output waveform is maintained as a linear function of sensor conductance $G_s$. Accordingly, any sensor having a highly linear conductance-versus-sensed parameter-magnitude relationship provides a highly linear sensed parameter-magnitude-to-frequency conversion, with a concurrent highly symmetrical output waveform being available from conversion apparatus 10'.

As previously set forth hereinabove, one desired use for a sensed-parameter-magnitude-to-frequency converter is for displaying ambient temperature via the time and/or frequency display circuitry 70 already present in a digital clock and/or digital clock radio. Circuitry 70 may include a preset counter means 72 having a gate input 72a receiving counting gate timing information, e.g. a precise-one-second wide gate pulse, from a counter timing means 74, and having a count input 72b receiving the output frequency $f_{OUT}$ from temperature-to-frequency converter 10'. Preset counter means 72 counts the number of converter output frequency pulses in the gate period and provides at a counter output 72c a digital representation of the difference between the preset count and the circuitry input count to a temperature display means 76. Display means 76, which may be configured with light-emitting diodes, liquid crystal display cell and other known technologies, displays the magnitude of the parameter (temperature) sensed by sensor 50 of converter circuit 10'. One preset counter means is the AMI 247A 4667-8455 preset counter integrated circuit, in which the counter is preset to an initial count of −160, i.e. 160 counted pulses are required at counting input 72b for the counter output 72c to provide a digital representation of 0, with a count of less than 160 pulses appearing as the digital output representation of a negative number and a count of greater than 160 pulses appearing as the digital representation of a positive number, of magnitude equal to the number of pulses actually received, less 160. This form of preset counting allows negative temperature values to be sensed and displayed. Thus, as shown in FIG. 2c, where the value of sensor resistance $R_s$ is chosen to provide a highly linear change in sensor network conductance with linear changes in sensed temperature, the conversion apparatus 10' provides an output frequency $f_{OUT} = 160 + T$ pulses per gate time interval, where T is sensed temperature. The preset counter will receive 160 pulses when a zero degree temperature is sensed by the thermister sensor of network 50, to provide a zero count output to the temperature display; as the output frequency changes by one pulse per gate time interval (e.g. 1 Hz.) for each degree change in sensed temperature, the relationship between timer apparatus output frequency and sensed temperature a linear and the temperature display 76 displays the sensed temperature without requiring additional linearization or scaling circuitry.

If a single temperature format (centigrade or fahrenheit) of display is desired, and if the total range of temperature to be accurately displayed is relatively narrow, sensor network 50 may consist of a single sensor, e.g. non-linear thermistor 60, with its associated resistors 62, 64 and (if required) 66, to establish a highly linear conductance having a predetermined slope and a specified conductance value at a specified value of sensed parameter, using the linearization methods as set forth more fully in the above-referenced copending application Ser. No. 121,488, incorporated herein in its entirety by reference. An extended sensed parameter range may be facilitated by a linear conductance sensor 50' using a plurality of generally non-linear sensors 80a-80n with each of the sensors having its sensed-parameter-responsive resistance $R_1'-R_n'$ each in series with a fixed resistance $R_A-R_N$. The series branch circuits are in parallel with each other and with a fixed resistance 82 of value $R_2'$. The paralleled plurality of (n+1) sensors and fixed resistor 82 are in series with another fixed resistance 84, of resistance $R_3'$.

A switch means 86 may be utilized to select a desired one of a plurality of sensor networks 50 and 50', if two different sensed parameter ranges and/or modes are desired. Thus, if a temperature-to-frequency conversion apparatus must measure temperature in both degrees Centigrade and degrees Fahrenheit, a first sensor network 50 (which may have one or a plurality of temperature-sensing thermistors therein) may be configured for sensing of Fahrenheit temperatures while the other sensor network 50', also having one or a plurality of temperature-sensing thermistors and a plurality of fixed resistors therein, will be configured for sensing temperature in degrees Centigrade. Each sensor network allows the apparatus to provide a linear frequency output with appropriate slope and intercept. Switch means 86 may, as illustrated, be a single-pole, double-throw switch (which may be electronic, mechanical, eletromechanical and the like) utilized to connect only the desired sensor network between timer integrated circuit output 11c' and the non-grounded terminal of timing capacitance C, at the paralleled trigger and threshold inputs 11c' and 11d', respectively, of timer integrated circuit 11'. If only one sensor network, e.g. network 50, is to be utilized, switch means 86 may be deleted and a direct connection, shown by broken line 88, utilized between timer output 11c' and that end of sensor network 50 furthest from the timing capacitance. Even if a plurality of sensed parameter formats are to be displayed, e.g. display in temperature degrees Centigrade or degrees Fahrenheit, a single network 50 may be utilized with a switch means 90 connected at the junction between the paralleled branch circuits (e.g. of fixed resistance 62 and thermistor 60 and, if required, series resistance 66) to place a shunting resistor 92 in parallel across network series resistance 64, or a shunting resistor 94 in parallel across the paralleled sensor network branch circuits, i.e. across the first fixed resistance 62. By proper selection of resistances 62, 64, 66, 92 and 94 (plus additional series resistances $R_N$, if a multiple sensor network is utilized) the output frequency $f_{OUT}$ of timing apparatus 10' can be selected for different parameter display modes with a highly linear relationship to the magnitude of the sensed parameter, with preselected slope of frequency change with respect to a linear change in sensed parameter magnitude and with a pre-selected output frequency at a given parameter value within the sensed parameter range.

While the present invention has been described with respect to presently preferred embodiments thereof, many variations and modifications will now become apparent to those skilled in the art. It is our intent, therefore, to be limited only by the scope of the appending claims and not by the specific details disclosed herein.

What is claimed is:

1. In apparatus for converting the magnitude of a sensed parameter to the frequency of an output waveform, of the type having means providing an output waveform cyclically alternating, relative to a preselected potential of fixed magnitude, between first and second output voltage levels, responsive to a voltage at a single input respectively less than or equal to a first reference potential and greater than or equal to a second reference potential, the improvement comprising:
   a timing capacitance element connected between the single input and the preselected potential; and
   network means connected between said output and said single input for providing an electrical conductance therebetween of magnitude substantially linearly related to the magnitude of the sensed parameter; the conductance of said network means causing said timing capacitance element to cyclically charge and discharge to said second and first reference potentials respectively to provide said output waveform substantially as a squarewave having a frequency established by said preselected timing capacitance and network conductance values and substantially linearly proportional to the conductance value of said network means.

2. The improved apparatus of claim 1, wherein said network means comprises at least one sensor non-linearly converting the magnitude of the sensed parameter to an electrical resistance magnitude; a first fixed magnitude electrical resistance element in electrical parallel connection with said at least one sensor; and a second fixed magnitude electrical resistance element in electrical series connection with the paralleled first fixed resistor element and said at least one sensor.

3. The improved apparatus of claim 2, further comprising a series resistance element of fixed magnitude in electrical series connection with at least one of said sensors.

4. The improved apparatus of claim 1, wherein said sensed parameter is temperature and said network means comprises at least one thermistor.

5. The improved apparatus of claim 1, in combination with means receiving the output waveform for displaying the frequency thereof to indicate the magnitude of the sensed parameter.

6. The improved apparatus of claim 5, wherein said display means comprises means for counting the frequency of the output waveform during a pre-selected time interval; and means receiving the count from said counting means at the cessation of said timing interval for displaying the counted frequency.

7. The improved apparatus of claim 6, wherein said counting means comprises a counter having a first input receiving the output waveform, a second input receiving a gating signal for enabling the counter to count the frequency of the output waveform for said preselected time interval, and an output at which the counted frequency is provided; and counter timing means connected to said second counter input for providing the selected time interval gating signal.

8. The improved apparatus of claim 7, wherein said counting means is preset, prior to each counting time interval, to a preselected count; the count provided at the output of said counting means being changed from the preset count by the frequency of said output waveform.

9. In apparatus for converting the magnitude of a sensed parameter to the frequency of an output waveform, of the type having means, receiving an operating potential, for providing an output waveform cyclically alternating, relative to a preselected potential of fixed magnitude, between first and second output voltage levels, responsive to a voltage at an input respectively less than or equal to a first reference potential and greater than or equal to a second reference potential; the improvement comprising:
   a timing capacitance element connected between the input and the preselected potential;
   network means connected between said output and said input for providing an electrical conductance therebetween of magnitude substantially linearly related to the magnitude of the sensed parameter; the conductance of said network means causing said timing capacitance element to cyclically charge and discharge to said second and first reference potentials respectively to provide said output waveform substantially as a squarewave having a frequency established by said preselected timing capacitance and network conductance values and substantially linearly proportional to the conductance values of said network means; and means for adjusting the magnitudes of said first and second reference potentials to compensate for a tolerance range of at least the capacitance magnitude of said timing capacitive element; said adjusting means affecting the substantially linear sensed parameter magnitude versus apparatus output frequency relationship only by a constant.

10. The improved apparatus of claim 9, wherein said first and second reference potentials are established by means of dividing the magnitude of the operating potential; and said adjusting means is a variable resistance element of settable magnitude connected to at least a portion of said potential dividing means.

11. The improved apparatus of claim 9, wherein said sensed parameter is temperature and said network means comprises at least one thermistor.

12. The improved apparatus of claim 9, in combination with means receiving the output waveform for displaying the frequency thereof to indicate the magnitude of the sensed parameter.

13. The improved apparatus of claim 12, wherein said display means comprises means for counting the frequency of the output waveform during a preselected time interval; and means receiving the count from all said counting means at the cessation of said timing interval for displaying the counted frequency.

14. The improved apparatus of claim 13, wherein said counting means comprises a counter having a first input receiving the output waveform, a second input receiving a gating signal for enabling the counter to count the frequency of the output waveform for said selected time interval, and an output at which the counted frequency is provided; and counter timing means connected to said second counter input for providing the selected time interval gating signal.

15. The improved apparatus of claim 14, wherein said counting means is preset, prior to each counting time interval, to a preselected count; the count provided at the output of said counting means being changed from the preset count by the frequency of said output waveform.

16. In apparatus for converting the magnitude of a sensed parameter to the frequency of an output waveform of a type having means providing an output waveform cyclically alternating, relative to a preselected potential of fixed magnitude, between first and second output voltage levels, responsive to a voltage at an input respectively less than or equal to a first reference potential and greater than or equal to a second reference potential, the improvement comprising:

a timing capacitance element connected between the input and the preselected potential;
network means connected between said output and said input for providing an electrical conductance therebetween of magnitude substantially linear related to the magnitude of the sensed parameter; said network means including at least one sensor non-linear converting the magnitude of the sensed parameter to an electrical resistance magnitude; a first fixed magnitude electrical resistance element in electrical parallel connection with said at least one sensor; and a second fixed magnitude electrical resistance element an electrical series connection with the parallel first fixed resistor element and said at least one sensor;
the conductance of said network means causing said timing capacitance element to cyclically charge and discharge to said second and first reference potentials respectively to provide said output waveform substantially as a squarewave having a frequency established by said preselected timing capacitance and network conductance values and substantially linearly proportional to the conductance value of said network means; and
means for switching an additional fixed magnitude resistance element between the junction between said first and second fixed magnitude resistive elements and a selected one of said input and output.

17. The improved apparatus of claim 16, wherein said sensed parameter is temperature and said network means comprises at least one thermistor.

18. The improved apparatus of claim 16, in combination with means receiving the output waveform for displaying the frequency thereof to indicate the magnitude of the sensed parameter.

19. The improved apparatus of claim 18, wherein said display means comprises means for counting the frequency of the output waveform during a preselected time interval; and means receiving the count from said counting means at the cessation of said timing interval for displaying the counted frequency.

20. The improved apparatus of claim 19, wherein said counting means comprises a counter having a first input receiving the output waveform, a second input receiving a gating signal for enabling the counter to count the frequency of the output waveform for said selected time interval, and an output at which the counted frequency is provided; and counter timing means connected to said second counter input for providing the selected time interval gating signal.

21. The improved apparatus of claim 20, wherein said counting means is preset, prior to each counting time interval, to a preselected count; the count provided at the output of said counting means being changed from the preset count by the frequency of said output waveform.

22. In apparatus for converting the magnitude of a sensed parameter to the frequency of an output waveform, of the type having means providing an output waveform cyclically alternating, relative to a preselected potential of fixed magnitude, between first and second output voltage levels, responsive to a voltage at an input respectively less than or equal to a first reference potential and greater than or equal to a second reference potential, the improvement comprising:

a timing capacitance element connected between the input and the preselected potential; and
network means connected between said output and said input for providing an electrical conductance therebetween of magnitude substantially linearly related to the magnitude of the sensed parameter; said network means comprising a plurality of individual sensor networks, each network having first and second end terminals with a first end terminal of each network connected together to said input; and means for switching the output to a selected one of the second ends of said plurality of networks;
the conductance of said network means causing said timing capacitance element to cyclically charge and discharge to said second and first reference potentials respectively to provide said output waveform substantially as a squarewave having a frequency established by said preselected timing capacitance and network conductance values and substantially linearly proportional to the conductance value of said network means.

23. The improved apparatus of claim 22, wherein said sensed parameter is temperature and said network means comprises at least one thermistor.

24. The improved apparatus of claim 23, in combination with means receiving the output waveform for displaying the frequency thereof to indicate the magnitude of the sensed parameter.

25. The improved apparatus of claim 24, wherein said display means comprises means for counting the frequency of the output waveform during a preselected time interval; and means receiving the count from said counting means at the cessation of said timing interval for displaying the counted frequency.

26. The improved apparatus of claim 25, wherein said counting means comprises a counter having a first input receiving the output waveform, a second input receiving a gating signal for enabling the counter to count the frequency of the output waveform and a second input receiving a gating signal for enabling the counter to count the frequency of the output waveform for said selected time interval, and an output at which the counted frequency is provided; and counter timing means connected to said second counter input for providing the selected time interval gating signal.

27. The improved apparatus of claim 26, wherein said counting means is preset, prior to each counting time interval, to a preselected count; the count provided at the output of said counting means being changed from the preset count by the frequency of said output waveform.

* * * * *